(12) United States Patent
Ishiguro et al.

(10) Patent No.: US 7,143,445 B1
(45) Date of Patent: Nov. 28, 2006

(54) INFORMATION PROCESSING APPARATUS, INFORMATION PROCESSING METHOD, AND PROGRAM STORAGE MEDIUM

(75) Inventors: Ryuji Ishiguro, Tokyo (JP); Takumi Okaue, Kanagawa (JP); Tateo Ooishi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/576,621

(22) Filed: May 23, 2000

(30) Foreign Application Priority Data

May 31, 1999 (JP) ............................... P11-152060

(51) Int. Cl.
G06F 7/04 (2006.01)
G06F 17/30 (2006.01)
G06F 12/14 (2006.01)
G06F 11/30 (2006.01)
H04L 9/32 (2006.01)

(52) U.S. Cl. ............................ 726/31; 726/27; 726/32; 713/189

(58) Field of Classification Search ................. 713/201, 713/185, 189; 705/51, 52, 53, 54, 55, 56, 705/57; 726/2, 31, 32
See application file for complete search history.

(56) References Cited

U.S. PATENT DOCUMENTS

| 5,109,413 A | * | 4/1992 | Comerford et al. ............ 705/54 |
| 5,457,746 A | * | 10/1995 | Dolphin ........................ 705/51 |
| 5,530,752 A | * | 6/1996 | Rubin .......................... 705/59 |
| 5,673,316 A | * | 9/1997 | Auerbach et al. ............. 705/51 |
| 5,763,316 A | * | 6/1998 | Chen et al. .................. 438/446 |
| 5,765,152 A | * | 6/1998 | Erickson ........................ 707/9 |
| 5,822,771 A | * | 10/1998 | Akiyama et al. ............ 711/162 |
| 5,883,958 A | * | 3/1999 | Ishiguro et al. ............... 705/57 |
| 5,978,812 A | * | 11/1999 | Inokuchi et al. ............. 707/200 |
| 6,067,640 A | * | 5/2000 | Akiyama et al. ............. 714/38 |
| 6,081,897 A | * | 6/2000 | Bersson ....................... 713/200 |
| 6,101,606 A | * | 8/2000 | Diersch et al. ............... 726/27 |
| 6,138,203 A | * | 10/2000 | Inokuchi et al. ............. 711/103 |

(Continued)

FOREIGN PATENT DOCUMENTS

EP 0 874 299 10/1998

(Continued)

OTHER PUBLICATIONS

Online Publication, http://www.dtcp.com/data/wp_spec.pdf, XP-002213172, pp. 1-13, "5C Digital Transmission Content Protection White Paper", Jul. 14, 1998.

*Primary Examiner*—Ayaz Sheikh
*Assistant Examiner*—Christian LaForgia
(74) *Attorney, Agent, or Firm*—Oblon, Spivak, McClelland, Maier & Neustadt, P.C.

(57) ABSTRACT

When a content is moved from a flash memory into a content database, a usage rule management program updates a variable seq-1, stored in a 0th defective block of a media defect list stored in the flash memory, to a new value seq-2. The usage rule management program calculates an MAC value (hash value) on the basis of the content stored in the data portion of the flash memory, an encrypted encryption key, and important information including the variable seq#. The usage rule management program then compares the calculated value with an MAC value stored in the header portion of the flash memory. If these two values are not equal, the usage rule management program disables reproduction of the content thereby preventing the content from being copied in an unauthorized manner.

9 Claims, 10 Drawing Sheets

U.S. PATENT DOCUMENTS

| | | | |
|---|---|---|---|
| 6,144,969 A * | 11/2000 | Inokuchi et al. | 707/200 |
| 6,256,391 B1 * | 7/2001 | Ishiguro et al. | 380/203 |
| 6,314,409 B1 * | 11/2001 | Schneck et al. | 705/54 |
| 6,345,256 B1 * | 2/2002 | Milsted et al. | 705/1 |
| 6,360,325 B1 * | 3/2002 | Chao | 713/200 |
| 6,477,134 B1 * | 11/2002 | Stebbings et al. | 369/272 |
| 6,519,701 B1 * | 2/2003 | Kawamura et al. | 726/2 |
| 6,591,365 B1 * | 7/2003 | Cookson | 713/176 |
| 6,611,812 B1 * | 8/2003 | Hurtado et al. | 705/26 |
| 6,615,353 B1 * | 9/2003 | Hashiguchi | 713/185 |
| 6,636,689 B1 * | 10/2003 | Stebbings | 386/94 |
| 6,650,761 B1 * | 11/2003 | Rodriguez et al. | 382/100 |
| 6,684,199 B1 * | 1/2004 | Stebbings | 705/57 |
| 6,751,598 B1 * | 6/2004 | Yagawa et al. | 705/51 |

FOREIGN PATENT DOCUMENTS

| | | |
|---|---|---|
| EP | 0 978 839 | 2/2000 |
| EP | 1 041 573 | 10/2000 |

* cited by examiner

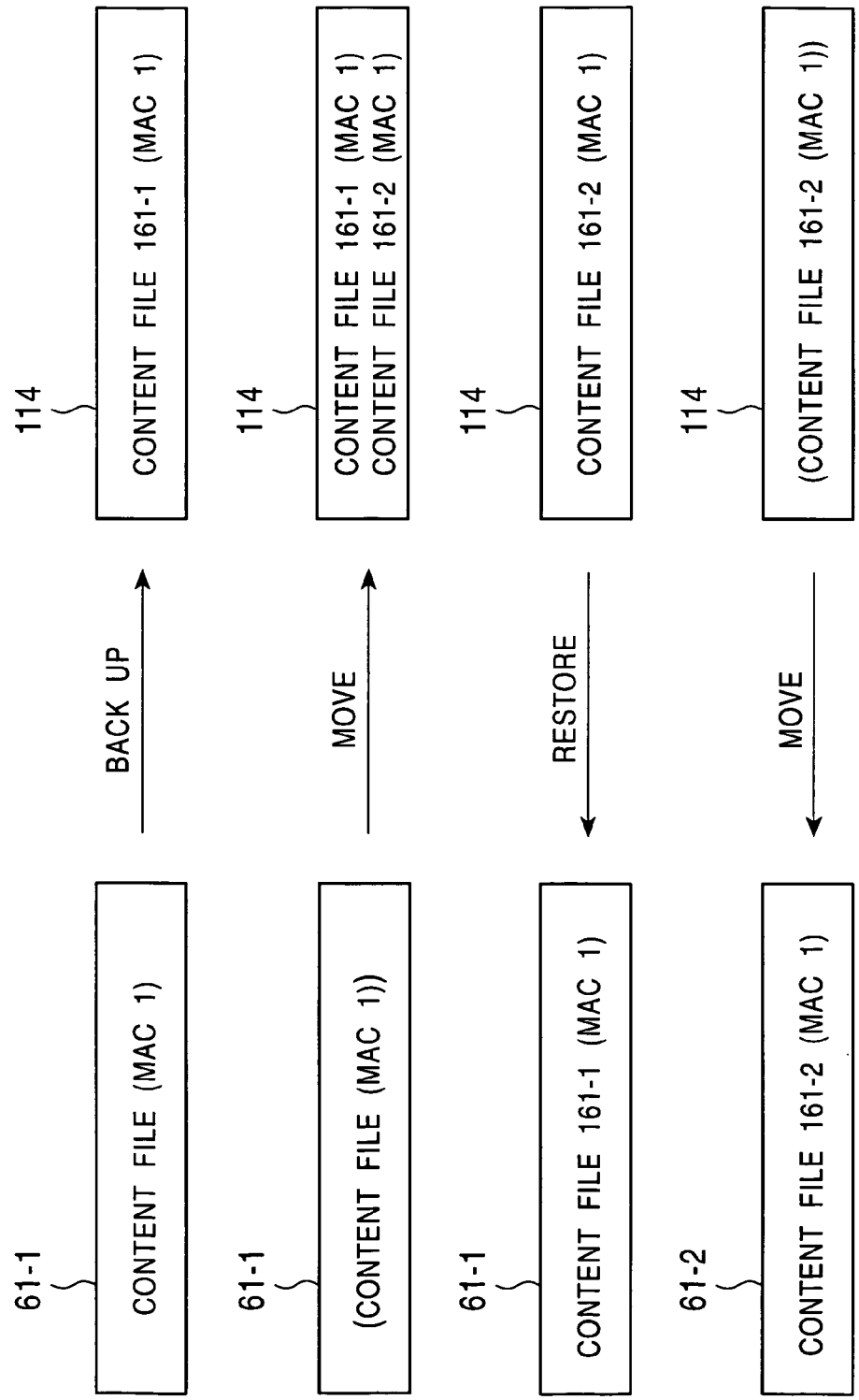

FIG. 8A

|   | DEFECT (BAD) BLOCK | ALTERNATIVE BLOCK |
|---|---|---|
| 0 |   |   |
| 1 |   |   |
| 2 |   |   |
| 3 |   |   |
| 4 |   |   |
| 5 |   |   |

FIG. 8B

| seq 1 |
|---|
| seq 2 |
| seq 3 |
| seq 4 |

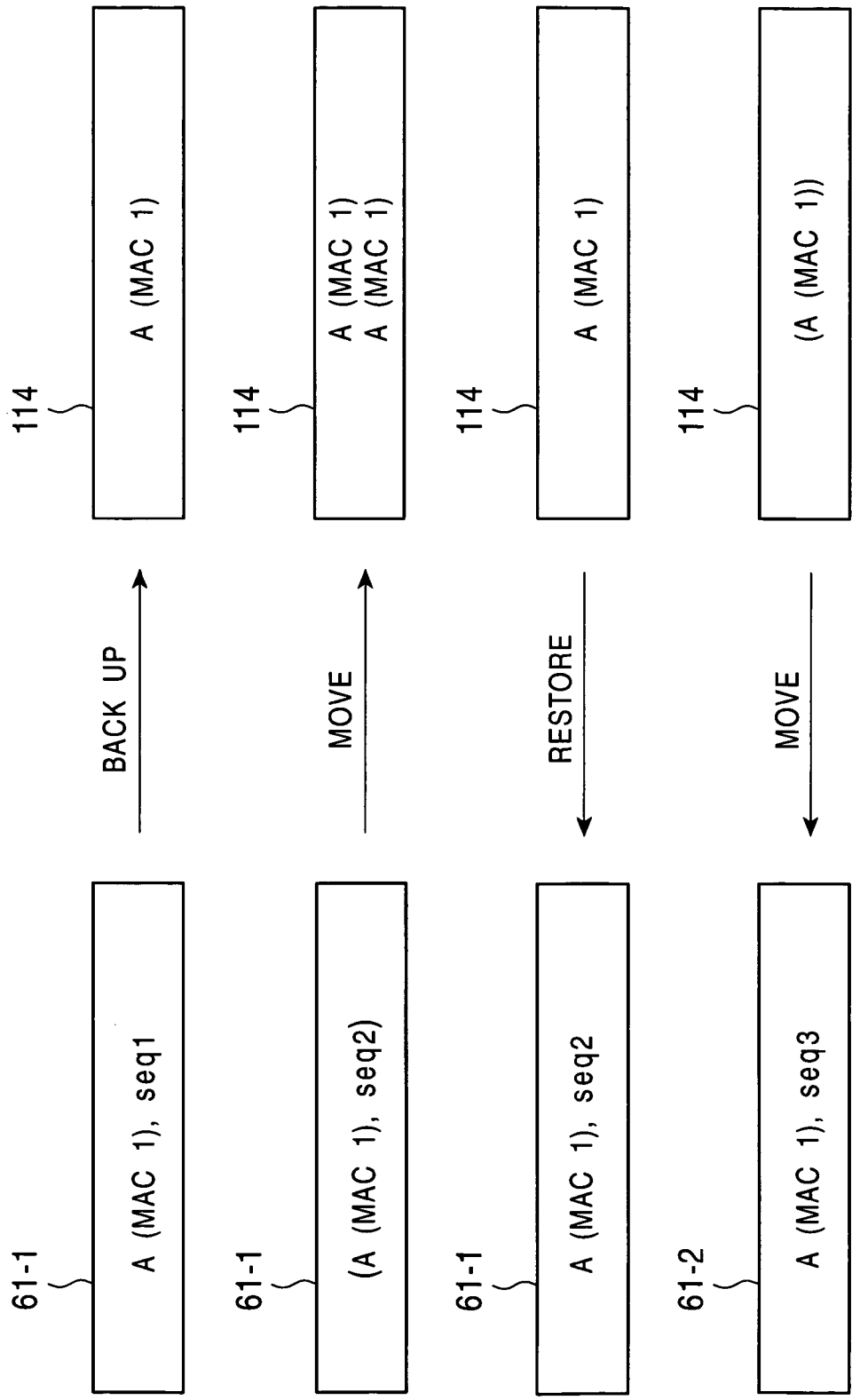

INFORMATION PROCESSING APPARATUS, INFORMATION PROCESSING METHOD, AND PROGRAM STORAGE MEDIUM

BACKGROUND OF THE INVENTION

1. Field of the Invention

The present invention relates to an information processing apparatus, an information processing method, and a program storage medium, and more particularly, to an information processing apparatus, an information processing method, and a program storage medium, which make it possible to prevent data from being tampered or copied in an unauthorized manner.

2. Description of the Related Art

Digital technology has become very popular. As a result, various types of content data such as music data and image data are digitally recorded and reproduced onto or from a storage medium. This makes it possible to copy content data many times without resulting in degradation in image or sound quality.

However, the advance in the digital technology has created the following problems.

1. For example, digital music data can be copied from a compact disk (CD) into a hard disk of a personal computer. In this case, the music data recorded on the CD is directly recorded on the hard disk or recorded after being compressed. This makes it possible to distribute a great number of copies via a network such as the Internet.

2. There is no limitation in the maximum number of times that digital music data is copied from a CD into a hard disk of a personal computer. This makes it possible to distribute a great number of copies.

3. When digital music data recorded on a hard disk of a personal computer is copied into an external device such as a portable device, the original music data remains on the hard disk after making a copy. This makes it possible to distribute a great number of copies.

4. The problem described in (3) may be avoided if a personal computer is controlled by software such that data such as digital music data stored on a hard disk is deleted after the data has been transferred to an external device (that is, music data is moved). However, even in this case, the original data can be left on the hard disk by making a backup copy of the data stored on the hard disk onto another storage medium before moving the data and restoring the backup data onto the hard disk 5. When digital music data recorded on a hard disk of a computer is copied into an external device such as a portable device, the personal computer does not check the authorization of the external device. This makes it possible to copy digital music data into an unauthorized device.

6. When digital music data is copied from an external device such as a portable device into a personal computer, the external device does not check the authorization of software which controls the personal computer. This makes it possible to copy digital music data into a personal computer using unauthorized software.

7. In some cases, when music data is reproduced by a personal computer from a CD, ISRC (International Standard Recording Code) included in the music data is used by the personal computer to determine whether a plurality of contents are the same or not. However, some CDs do not include ISRC data. In this case, it is impossible to determine whether a plurality of contents are the same or not.

8. The various functions described above are realized on a personal computer by means of software. Therefore, if the software is tampered, it may become possible to operate the computer in a manner different from that intended by a system designer.

In view of the above, an object of the present invention is to provide a technique for preventing content data stored on a hard disk from being tampered or copied in an unauthorized manner.

SUMMARY OF THE INVENTION

In accordance with an aspect of the present invention, there is provided an information processing apparatus comprising: storage means for storing content data encrypted with an encryption key; holding means for holding management information associated with the content data stored in the storage means; calculation means for performing a predetermined calculation on the basis of the encryption key and calculation information included in the management information, the calculation information including update information which is updated with predetermined timing; memory means for storing the result of the calculation performed by the calculation means; and control means for comparing the result of the calculation performed by the calculation means with a previous calculation result stored in the memory means and controlling use of the content data stored in the storage means in accordance with the result of the comparison. Preferably, the calculation means performs the calculation by applying a hash function to the calculation information and the encryption key.

Preferably, the content data is music data, the calculation information includes identification information identifying the music data, and the holding means holds the update information in an area which is not allowed to be read or written for a general purpose.

According to another aspect of the present invention, there is provided an information processing method comprising the steps of: storing content data encrypted with an encryption key; holding management information associated with the content data stored in the storage step; performing a predetermined calculation on the basis of the encryption key and calculation information included in the management information, the calculation information including update information which is updated with predetermined timing; memory means for memorizing the result of the calculation performed in the calculation step; and comparing the result of the calculation performed in the calculation step with a previous calculation result memorized in the memorizing step and controlling use of the content data stored in the storage step in accordance with the result of the comparison.

According to still another aspect of the present invention, there is provided a program storage medium on which a program is stored, the program including the steps of: storing content data encrypted with an encryption key; holding management information associated with the content data stored in the storage step; performing a predetermined calculation on the basis of the encryption key and calculation information included in the management information, the calculation information including update information which is updated with predetermined timing; memory means for memorizing the result of the calculation performed in the calculation step; and comparing the result of the calculation performed in the calculation step with a previous calculation result memorized in the memorizing step and controlling use of the content data stored in the storage step in accordance with the result of the comparison.

As described above, in the information processing apparatus, the information method, and the program stored in the program storage medium, according to the present invention, the result of a calculation performed on the basis of calculation information and an encryption key is compared with a previous calculation result, and use of stored content data is controlled in accordance with the comparison result

BRIEF DESCRIPTION OF THE DRAWINGS

FIG. 7 is a schematic diagram illustrating the operation of the flash memory shown in FIG. 3, performed during the process shown in FIG. 6;

FIGS. 8A and 8B are schematic diagrams illustrating a media defect list;

FIG. 10 is a schematic diagram illustrating the operation of the flash memory, performed during the process shown in FIG. 9.

DESCRIPTION OF THE PREFERRED EMBODIMENT

Figure 1:
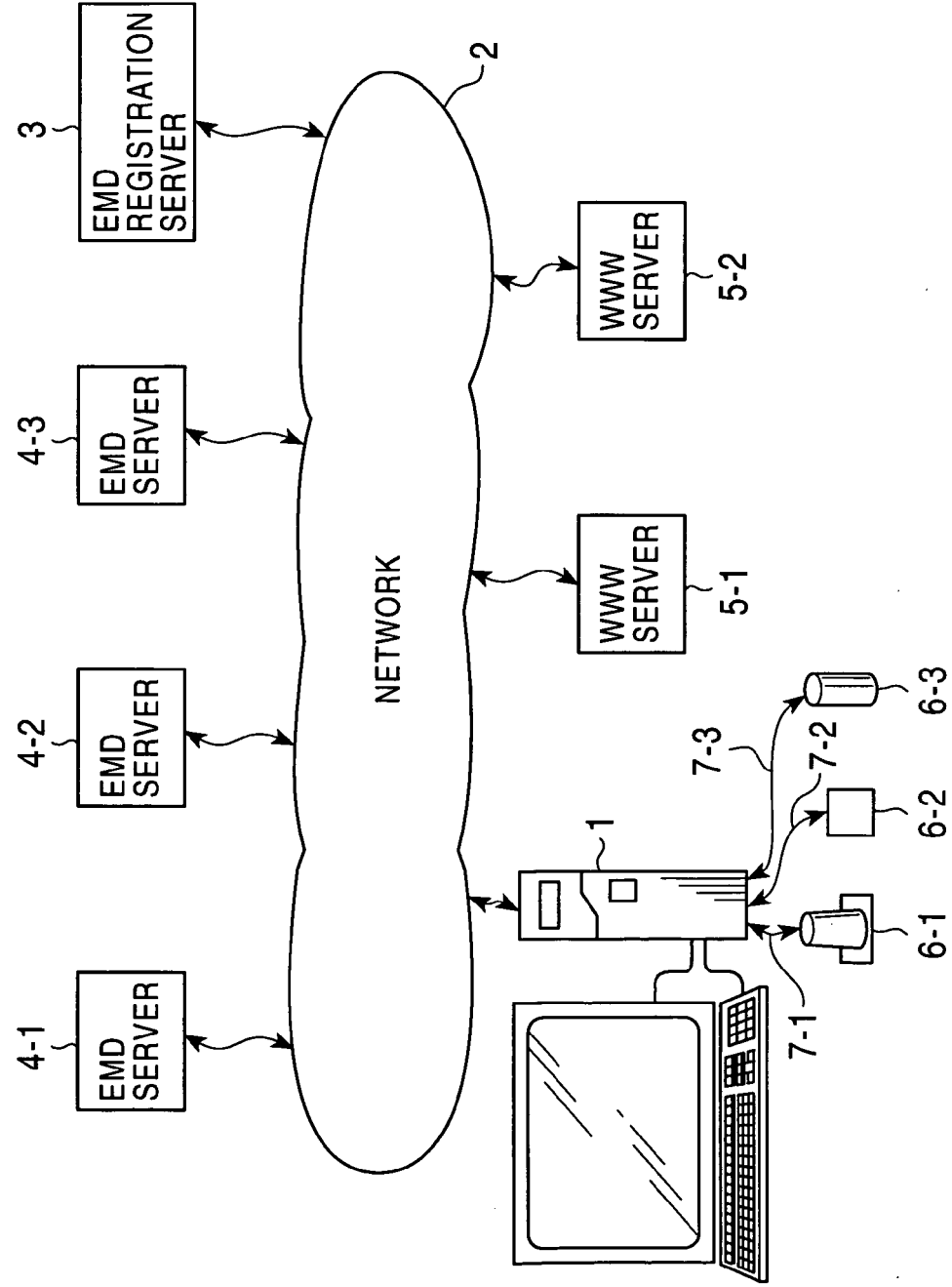
FIG. 1 is a schematic diagram illustrating an embodiment of a content data management system according to the present invention.

FIG. 1 is a schematic diagram illustrating an embodiment of a content data management system according to the present invention. A personal computer 1 is connected to a network 2 such as a local area network or the Internet. If the personal computer 1 receives music data (hereinafter also represented as a content) from any of EMD (electrical music distribution) servers 4-1 to 4-3 or form a CD (compact disc) which will be described later, the personal computer 1 stores the received data after compressing and encrypting it according to a predetermined compression method (such as ATRAC-3 (trade mark)) and an encryption method such as DES (Data Encryption Standard).

The personal computer 1 also stores data representing rules of using the content stored in the encrypted fashion.

The usage rule data represents, for example, the number of portable devices (PDs) allowed to simultaneously use the content corresponding to that usage rule data (that is, the number of PDs allowed to be checked out). The personal computer 1 can reproduce the content as long as the number of checked-out PDs is equal to or less than the number specified by the usage rule data.

The usage rule data also indicates that the content is allowed to be copied. That is, even when the content has been copied to any of portable devices 6-1 to 6-3, the personal computer 1 can reproduce the content stored thereon. The maximum number of times that the content is allowed to be copied to portable devices 6-1 to 6-3 may be specified. In this case, the content cannot be copied a greater number of times than the specified number of times.

The usage rule data may also indicate that the content is allowed to be moved into another personal computer. If the content is moved into any of portable devices 6-1 to 6-3, the content stored in the personal computer 1 becomes unusable (the content is deleted or the usage rule data is changed so that use of the content is disabled).

The details of the usage rule data will be described later.

When a content stored in the encrypted fashion is copied together with associated data (representing the content title and the reproduction conditions) from the personal computer 1 into the portable device 6-1 via a USB (universal serial bus) 7-1, the usage rule data associated with the copied content is updated (that is, checked out). More specifically, when a content is checked out, the usage rule data stored in the personal computer 1 in terms of the maximum allowable checkout number corresponding to the checked-out content is decremented by 1. If the maximum allowable checkout number is equal to 0, the corresponding content is no longer allowed to be checked out.

A content stored in the encrypted form in the personal computer 1 may also be copied together with associated data into the portable device 6-2 via the USB cable 7-2. In this case, the usage rule data associated with the content copied to the portable device 6-2 is updated. Similarly, when a content stored in the encrypted form in the personal computer 1 is copied together with associated data into the portable device 6-3 via the USB cable 7-3. the usage rule data associated with the content copied to the portable device 6-3 is updated.

The personal computer 1 may send a command via the USB cable 7-1 to the portable device 6-1 to delete (or disable use of) a content which has been checked out. In this case, the usage rule data associated with the deleted content is updated (that is, checked in). More specifically, when a content is checked in, the usage rule stored in the personal computer 1 in terms of the maximum allowable checkout number corresponding to the checked-in content is incremented by 1.

The personal computer 1 may also send a command via the USB cable 7-2 to the portable device 6-2 to delete (or disable use of) a content which has been checked out. In this case, the usage rule data associated with the deleted content is updated. Similarly, the personal computer 1 may also send a command via the USB cable 7-3 to the portable device 6-3 to delete (or disable use of) a content which has been checked out, and the usage rule data associated with the deleted content may be updated.

In the case where the portable device 6-1 has checked out a content from another personal computer (not shown in FIG. 1) other than the personal computer 1, that content cannot be checked in into the personal computer 1. Similarly, in the case where the portable device 6-2 has checked out a content from another personal computer other than the personal computer 1, that content cannot be checked in into the personal computer 1. Furthermore, in the case where the portable device 6-3 has checked out a content from another personal computer other than the personal computer 1, that content cannot be checked in into the personal computer 1.

When the personal computer 1 starts to acquire a content from one of EMD servers 4-1 to 4-3, the personal computer 1 requests an EMD registration server 3 to transmit an authentication key required for mutual authentication between the personal computer 1 and one of the EMD servers 4-1 to 4-3. In response to the request from the personal computer 1, the EMD registration server 3 transmits the authentication key to the personal computer 1 via the network 2. The EMD registration server 3 also transmits to the personal computer 1 a program required for connection with one of EMD servers 4-1 to 4-3.

If the EMD server 4-1 receives a request from the personal computer 1, the EMD server 4-1 supplies a requested content together with associated data (representing, for example, its title and limitations in terms of reproduction) to the personal computer 1 via the network 2. Similarly, if the EMD server 4-2 receives a request from the personal computer 1, the EMD server 4-2 supplies a requested content together with associated data to the personal computer 1 via the network 2. Furthermore, if the EMD server 4-3 receives a request from the personal computer 1, the EMD server 4-3 supplies a requested content together with associated data to the personal computer 1 via the network 2.

The contents supplied from the respective EMD servers 4-1 to 4-3 are compressed in accordance with the same or different compression methods. The contents supplied from the respective EMD servers 4-1 to 4-3 are encrypted in accordance with the same or different encryption methods.

If a WWW (World Wide Web) server 5-1 receives a request from the personal computer 1, the WWW server 5-1 transmits data representing information (as to for example the album title and the manufacturer of the CD) associated with the CD a content of which is read and data representing information (as to for example the content title and the composer name) associated with the content to the personal computer 1 via the network 2. If a WWW (World Wide Web) server 5-2 receives a request from the personal computer 1, the WWW server 5-2 transmits data representing information associated with the CD a content of which is read and data representing information associated with the content to the personal computer 1 via the network 2.

The portable device 6-1 stores a content supplied from the personal computer 1 (that is, a checked-out content) together with associated data (representing, for example, the title and/or limitations in terms of reproduction thereof). In accordance with the data associated with the content, the portable device 6-1 reproduces the content stored therein and outputs it to a headphone or the like (not shown).

For example, if a content is attempted to be reproduced a greater number of times than the maximum allowable number of times specified by the data associated with the content, the portable device 6-1 terminates the reproduction of that content. If a content is attempted to be reproduced after the expiration date specified by the data associated with the content, the portable device 6-1 does not reproduce that content.

A user may remove the portable device 6-1, in which the content is stored, from the personal computer 1, and may carry it to reproduce the stored content and listen to music corresponding to the content via a headphone or the like.

Similarly, the portable device 6-2 stores a content supplied from the personal computer 1 together with associated data. In accordance with the data associated with the content, the portable device 6-2 reproduces the content stored therein and outputs it to a headphone or the like (not shown). A user may remove the portable device 6-2, in which the content is stored, from the personal computer 1, and may carry it to reproduce the content and listen to music corresponding to the content via a headphone or the like.

Similarly, the portable device 6-3 stores a content supplied from the personal computer 1 together with associated data. In accordance with the data associated with the content, the portable device 6-3 reproduces the content stored therein and outputs it to a headphone or the like (not shown). A user may remove the portable device 6-3, in which the content is stored, from the personal computer 1, and may carry it to reproduce the content and listen to music corresponding to the content via a headphone or the like.

In the following discussion, in the case where one of the portable devices 6-1 to 6-3 is described without specifying a particular one, it is represented simply as a portable device 6.

Figure 2:
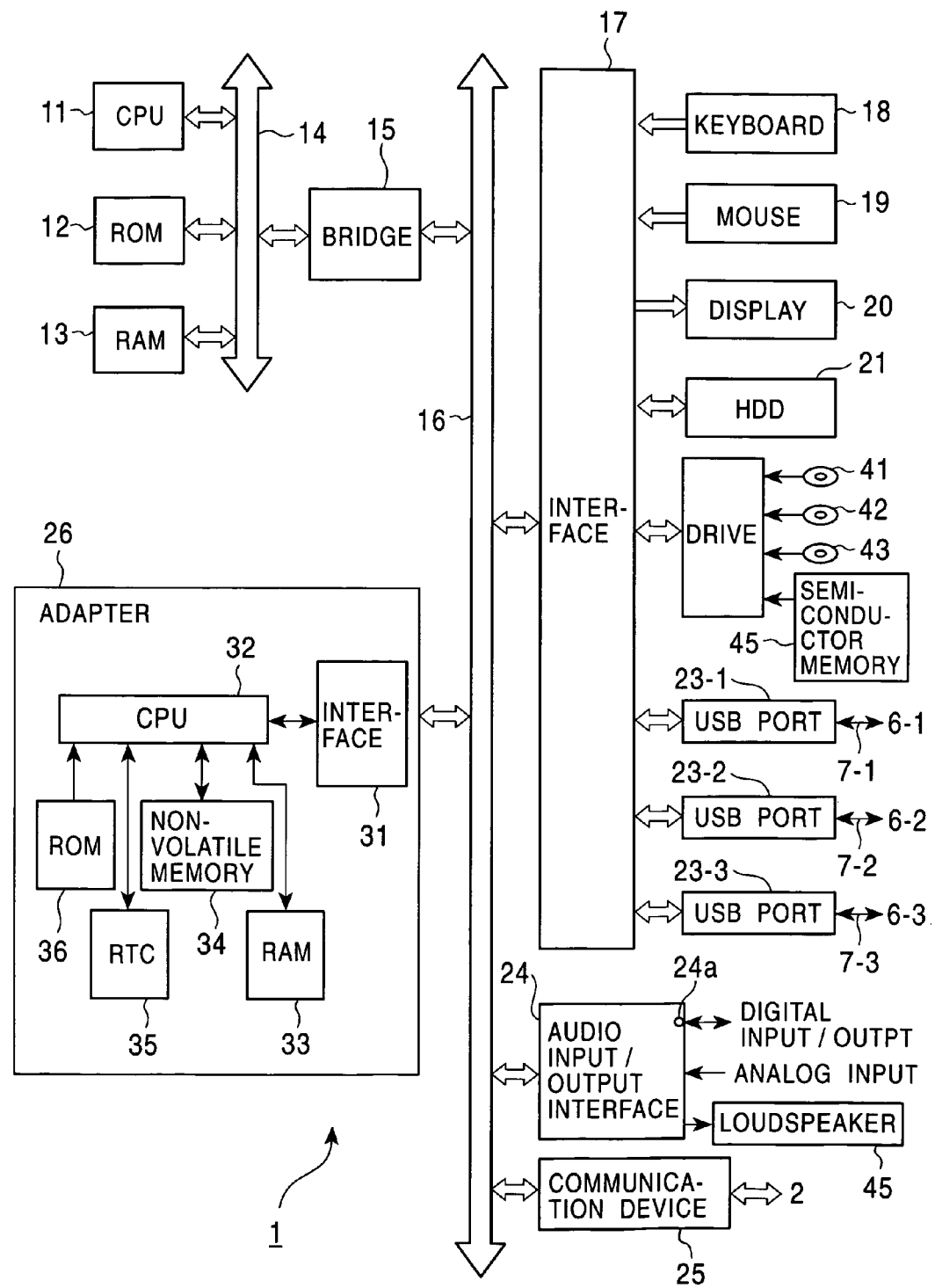
FIG. 2 is a schematic diagram illustrating a configuration of a personal computer shown in FIG. 1.

FIG. 2 illustrates a configuration of the personal computer 1. A CPU (central processing unit) 11 executes various application programs (which will be described in detail later) and an OS (operating system). A ROM (read only memory) 12 stores a fixed part of a program and/or a fixed parameter used by the CPU 11. A RAM (random access memory) 13 stores a program executed by the CPU 11 and/or a parameter which may vary during the execution of the program. These elements are connected to one another via a host bus 14 such as a CPU bus.

The host bus 14 is connected to an external bus 16 such as a PCI (peripheral component interconnect/interface) bus via a bridge 15.

A keyboard 18 is used by a user to input various commands to the CPU 11. A mouse 19 is used by the user to designate or select a point on the screen of a display 20. The display 20 may be a liquid crystal display or a CRT (cathode ray tube) display and it servers to display various kinds of information in the form of a text or an image. An HDD (hard disk drive) 21 drives a hard disk so as to record or reproduce a program executed by the CPU 11 or other information.

The drive 22 reads data or a program from a magnetic disk 41, an optical disk (such as a CD) 42, a magnetooptical disk 43, or a semiconductor memory 44 loaded on the drive 22 and supplies the resultant data or program to a RAM 13 via an interface 17, the external bus 16, the bridge 15, and the host bus 14.

A USB port 23-1 is connected to the portable device 6-1 via a USB cable 7-1. The USB port 23-1 outputs data (such as a content or a command to the portable device 6-1) supplied from the HDD 21, the CPU 11, or the RAM 13 via the interface 17, the external bus 17, the bridge 15, and/or the host bus 14, to the portable device 6-1.

A USB port 23-2 is connected to the portable device 6-2 via a USB cable 7-2. The USB port 23-2 outputs data (such as a content or a command to the portable device 6-2) supplied from the HDD 21, the CPU 11, or the RAM 13 via the interface 17, the external bus 17, the bridge 15, and/or the host bus 14, to the portable device 6-2.

A USB port 23-3 is connected to the portable device 6-3 via a USB cable 7-3. The USB port 23-3 outputs data (such as a content or a command to the portable device 6-3) supplied from the HDD 21, the CPU 11, or the RAM 13 via the interface 17, the external bus 17, the bridge 15, and/or the host bus 14, to the portable device 6-3.

An audio input/output interface 24 has an IEC (International Electrotechnical Commission)-60958 terminals 24a and executes an interfacing process to input/output digital audio data or analog audio data. A loudspeaker 45 generates a voice/sound corresponding to the content in accordance with the audio signal supplied via the audio input/output interface 24.

The above-described parts from the keyboard 18 to the audio input/output interface 24 are connected to an interface 17 which is connected to the CPU 11 via the external bus 16, the bridge 15, and the host bus 14.

A communication device 25 is connected to the network 2 so that data (such as a registration request or a content transmission request) supplied from the CPU 11 or the HDD 21 is transmitted in the form of packets via the network 2. The communication device 25 is also used to receive data (such as an authentication key or a content) in the form of packets and supply the received data to the CPU 11, the RAM 13, or the HDD 21.

An adapter 26 has a CPU 32 which is generally constructed in the form of a semiconductor integrated circuit. When the adapter 26 is mounted on the personal computer 1, the CPU 32 cooperates with the CPU 11 via the external bus 16, the bridge 15, and the host bus 14 so as to execute various processes. A RAM 33 is used to store data or a program required for the CPU 32 to execute various processes. A nonvolatile memory 34 stores data which is needed to be held after the power of the personal compute 1 is turned off. A ROM 36 stores a program for decrypting an encrypted program received from the personal computer 1. An RTC (real time clock) 35 performs a clocking operation and supplies time information.

The communication device 25 and the adapter 26 are connected to the CPU 11 via the external bus 16, the bridge 15, and the host bus 14.

In the following discussion, when one of the USB ports 23-1 to 23-3 is described without specifying a particular one, it is represented simply as a USB port 23. Similarly, when one of the USB cables 7-1 to 7-3 is described without specifying a particular one, it is represented simply as a USB cable 7.

Figure 3:
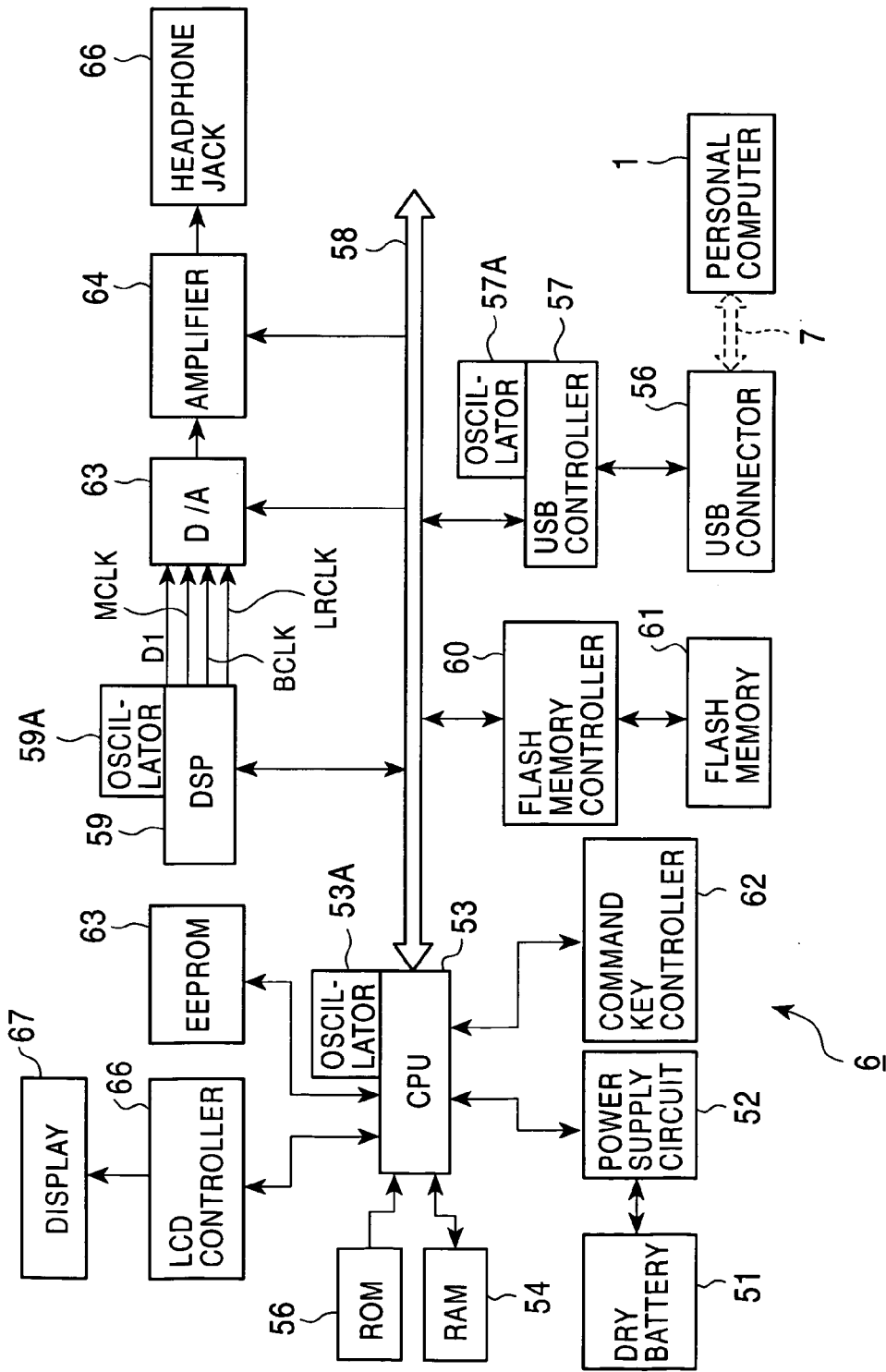
FIG. 3 is a schematic diagram illustrating a configuration of a portable device shown in FIG. 1.

The configuration of the portable device 6 is described below with reference to FIG. 3. A power supply circuit 52 receives a power supply voltage from a dry battery 51 and converts it internal power with a predetermined voltage. The resultant power is supplied to various parts from the CPU 53 to the display 67 over the entire portable device 6.

When a USB controller 57 is connected to the personal computer 1 via a USB connector 56 and a USB cable 7, if the USB controller 57 receives data such as a content from the personal computer 1, the USB controller 57 transfers it to the CPU 53 via an internal bus 58.

The data transmitted from the personal computer 1 is formed of packets each consisting of 64 bytes, and the data is transmitted at a rate of 12 Mbits/sec. The data transmitted into the portable device 6 is formed of a header and a content (as will be described in detail later).

If the portable device 6 receives a content write command together with a content from the personal computer 1, the CPU 53 controls the flash memory controller 60 so as to write the content received from the personal computer 1 into the flash memory 61 in accordance with the write command, under the control of the main program loaded from the ROM 55 into the RAM 54.

The flash memory has a storage capacity of about 64 Mbytes available for storing contents. The flash memory 61 includes a reproduction code for decompressing a compressed content according to a predetermined method.

The flash memory 61 is constructed in the form of a memory card which may be removed from the portable device 6.

If a user presses a play/stop button (not shown), and if, as a result, a play command is supplied to the CPU 53 via a command key controller 62, the CPU 53 controls the flash memory controller 60 so as to read a reproduction code and a content from the flash memory 61 and transfer them to a DSP 59.

In accordance with the reproduction code received from the flash memory 61, the DSP 59 performs a CRC (cyclic redundancy check) error detection operation upon the content and then reproduces it. The reproduced data (denoted by D1 in FIG. 3) is supplied to a digital-to-analog converter 63.

The DSP 59 reproduces a content in synchronization with a master clock MCLK generated by an internal oscillator circuit coupled with an oscillator 59A which includes an external quartz resonator. To the digital-to-analog converter 63, the DSP 59 also supplies the master clock MCLK, a bit clock BCLK with a predetermined frequency generated by the internal oscillator circuit on the basis of the master clock MCLK, and operation clocks LRCLK including an L-channel clock LCKL and an R-channel clock RCLK with a period corresponding to the frame interval.

The DSP 59 supplies the above-described operation clocks to the digital-to-analog converter 63 in accordance with the reproduction code when a content is being reproduced. However, when no content is reproduced, the DSP 50 stops the supply of the operation clocks in accordance with the reproduction code, thereby stopping the operation of the digital-to-analog converter 63 so as to reduce the total power consumption of the portable device 6.

Similarly, the CPU 53 and the USB controller 57 have external oscillators 53A and 57A, respectively, each including a quartz resonator, and they perform various operations in accordance with master clocks MCLK supplied from the oscillators 53A and 57A.

By forming the portable device 6 in the above-described manner, it becomes unnecessary for the portable device 6 to include a clock generator module for supplying a clock to circuit blocks such as the CPU 53, the DSP 59, and the USB controller 57. This results in a simplification in the circuit configuration and also a reduction in size.

The digital-to-analog converter 63 converts the reproduced content to an analog audio signal and supplies the resultant signal to an amplifier 64. The amplifier 64 amplifies the audio signal and supplies the amplified audio signal to a headphone (not shown) via a headphone jack 65.

As described above, when the play/stop button (not shown) of the portable device 6 is pressed, a content stored in the flash memory 61 is reproduced under the control of the CPU 53. If the play/stop button is pressed during the reproducing operation, the reproduction of the content is stopped.

After stopping the reproduction, if the play/stop button of the portable device 6 is pressed again, the reproduction of the content is restarted from the position where the reproduction has been stopped, under the control of the CPU 53. If no operation is performed for several seconds after the play/stop button was pressed to stop the reproduction, the portable device 6 automatically turns off the power so as to reduce the power consumption.

If the play/stop button is pressed after the power has been turned off, the portable device 6 starts reproducing the content not from the position where the reproduction has been stopped by the previous operation of pressing the play/stop button, but from the beginning of the content.

The CPU 53 of the portable device 6 controls the LCD controller 66 so as to display, on the display unit 67, information as to the reproduction mode (such as a repeat mode, a scan-and-play mode) the equalizer controller (gain controller for controlling the gains of an audio signal for various frequency bands), the content number, the play time, the operation status (play, stop, fast-forward, reverse), the sound volume, and the remaining capacity of the dry battery 51.

Furthermore, the portable device 6 includes an EEPROM 68 which stores a FAT (file allocation table) representing the number of contents stored in the flash memory 61, the block locations of the flash memory 61 where the contents are stored, and other various kinds of memory storage information.

In the present embodiment, each content is handled in units of blocks each including 64 Kbytes, and the block location of each content is described in the FAT.

In the case where the FAT is stored in the flash memory 61, the FAT is stored as follows. For example, if a first content is written into the flash memory 61 under the control of the CPU 53, the block location of the first content is written in the FAT in the flash memory 61. If a second content is written thereafter in the flash memory 61, the block location of the second content is written in the FAT in the flash memory 61 (in the same memory area as the first content).

As described above, the FAT is updated each time a content is written into the flash memory 61, and the same data is written in a duplicated fashion for the purpose of backup.

If the FAT is written in the flash memory 61, the same area of the flash memory 61 is rewritten twice each time a content is written. As a result, a small number of operations of writing contents into the flash memory 61 causes the number of rewriting operations to reach the maximum allowable number, and it becomes impossible to further rewrite the flash memory 61.

In the portable device 6, in order to avoid the above problem, the FAT is stored in the EEPROM 68 instead of the flash memory 61 thereby reducing the number of operations of rewriting the flash memory 61 required each time a content is written.

In the portable device 6, because the FAT which is frequently rewritten is stored in the EEPROM 68, the maximum allowable number of writing operations becomes several ten times or more greater than can be when the FAT is stored in the flash memory 61. Furthermore, the CPU 53 controls the EEPROM 68 such that the FAT is written in an appended fashion, thereby reducing the number of writing operation into the same area of the EEPROM 68 and thus preventing the EEPROM 68 from becoming unusable in a short time.

If the portable device 6 is connected to the personal computer 1 via the USB cable 7 (hereinafter, this state is represented as a USB-connected state), the USB controller 57 sends an interrupt signal to the CPU 53. Thus, the CPU 53 recognizes that the portable device 6 has been connected to the personal computer 1.

As a result, a current with a predetermined magnitude is supplied from the personal computer 1 to the portable device 6 via the USB cable 7. Furthermore, the CPU 53 controls the power supply circuit 52 such that the supply of power from the dry battery 51 is stopped.

When the portable device 6 is in the USB-connected state, the CPU 53 controls the DSP 59 so as to stop reproducing a content thereby preventing the external power supplied from the personal computer 1 from exceeding the maximum allowable current and thus allowing specified external power to be supplied to the portable device 6.

When the portable device 6 is USB-connected, the CPU 53 switches the power supply from the dry battery 51 to that supplied from the personal computer 1 as described above, so that the external electric power which is supplied from the personal computer 1 and which needs lower cost is used instead of using the dry battery 51 which needs higher power cost. This saves the life of the dry battery 51.

When external power is supplied to the portable device 6 from the personal computer 1 via the USB cable 7, the CPU 53 stops the reproducing operation of the DSP 59 thereby reducing radiation from the DSP 59 and thus reducing the total radiation from the system including the personal computer 1.

Figure 4:
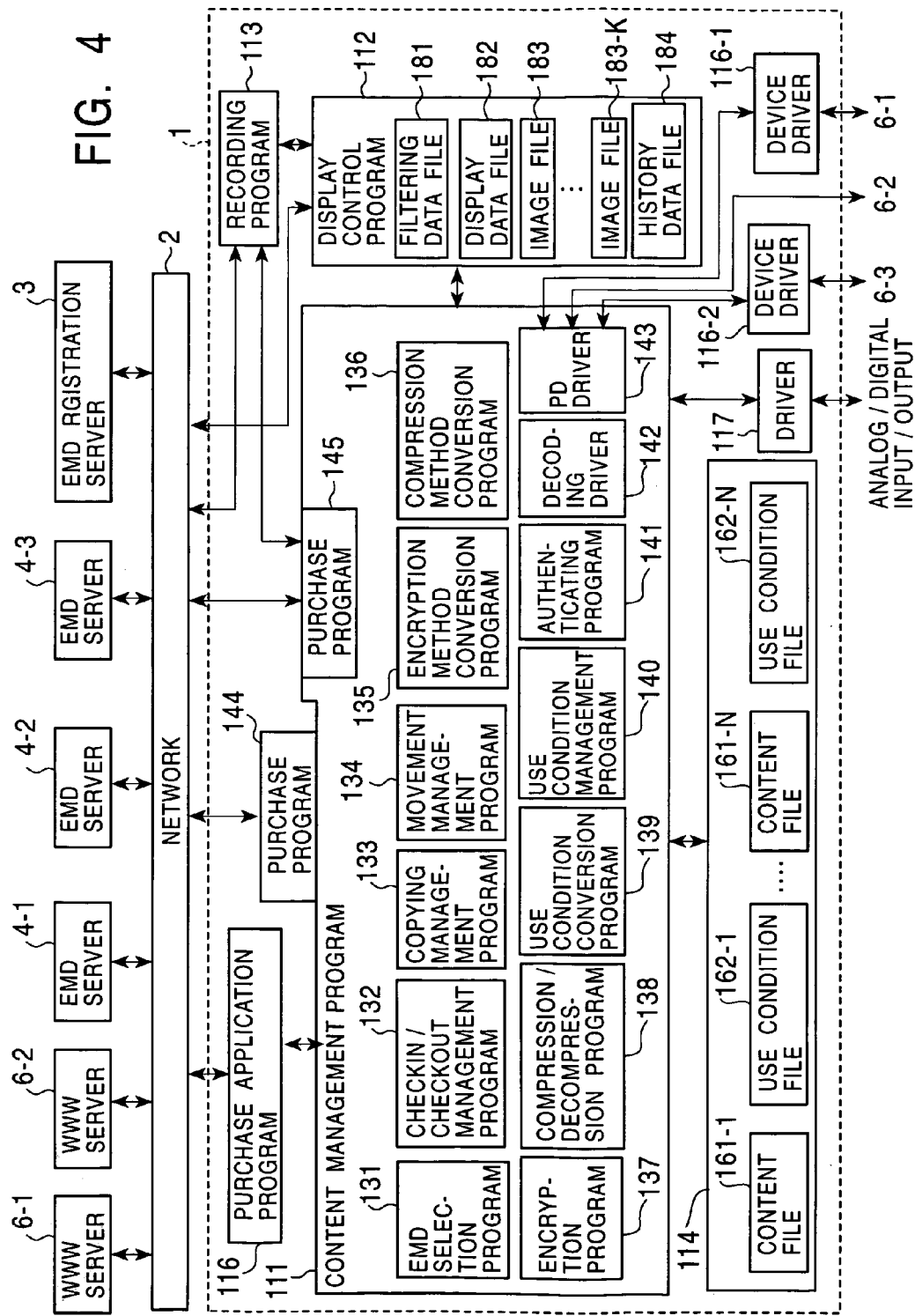
FIG. 4 is a block diagram illustrating functions of the personal computer shown in FIG. 1.

FIG. 4 is a block diagram illustrating the functions of the personal computer 1 achieved by means of executing a program by the CPU 11. A content management program 111 is formed of a plurality of programs including an RMD selection program 131,s a check-in/check-out management program 132, an encryption method conversion program 135, a compression method conversion program 136, an encryption program 137, a usage rule conversion program 139, a usage rule management program 140, an authentication program 141, a decryption program 142, a PD driver 143, a purchase program 144, and a purchase program 145.

The content management program 111 is described by shuffled or encrypted instructions so that the instructions are concealed from the outside. This makes it difficult for an unauthorized user to analyze the instructions (more specifically, if the unauthorized user directly reads the purchase program 144, it is impossible to analyze the instructions).

The EMD selection program 131 is not included in the content management program 111 initially installed in the personal computer 1, but the EMD selection program 131 is downloaded from an EMD registration serer 3 via the network during an EMD registration process which will be described later. The EMD selection program 131 selects one of EMD servers 4-1 to 4-3 and connects the personal computer 1 to the selected EMD server. After achieving the connection, the purchase application program 115 or the purchase program 144 or 145 communicates with the selected EMD server of the EMD servers 4-1 to 4-3 (so as to download a content to be purchased).

The check-in/check-out management program 132 checks out a content stored in one of the content files 161-1 to 161-N to one of the portable devices 6-1 to 6-3 or checks in a content stored in one of the portable device 6-1 to 6-3, in accordance with the check-in/check-out conditions and the usage rule files 162-1 to 162-N stored in the content database 114.

Depending on the check-in/check-out process performed, the check-in/check-out management program 132 updates the usage rule data described in the usage rule files 162-1 to 162-N stored in the content database 114.

A copying management program 133 copies a content stored in one of content files 161-1 to 161-N into one of portable devices 6-1 to 6-3 or copies a content from one of portable devices 6-1 to 6-3 into the content database 114, in accordance with the usage rule files 162-1 to 162-N described in the content database 114.

A movement management program 134 moves a content stored in one of content files 161-1 to 161-N into one of portable devices 6-1 to 6-3 or moves a content from one of portable devices 6-1 to 6-3 into the content database 114, in accordance with the usage rule files 162-1 to 162-N described in the content database 114.

The encryption conversion program 135 converts the encryption method of a content received from the EMD server 4-1 via the network 2 under the control of the purchase application program 115, or the encryption method of a content received from the EMD server 4-2 under the control of the purchase program 144, or the encryption method of a content received from the EMD server 4-3 under the control of the purchase program 145, into the same encryption method as that of contents stored in the content files 161-1 to 161-N stored in the content database 114.

The encryption method conversion program 135 also performs a conversion when a content is checked out into any of the portable devices 6-1 to 6-3 such that the content is encrypted according to an encryption method which can be decrypted by the portable devices 6-1 to 6-3.

The compression method conversion program 136 converts the compression method of a content received from the EMD server 4-1 via the network 2 under the control of the purchase application program 115, the compression method of a content received from the EMD server 4-2 under the control of the purchase program 144, or the encryption method of a content received from the EMD server 4-3 under the control of the purchase program 145, into the same compression method as that of contents stored in the content files 161-1 to 161-N stored in the content database 114.

When a content is checked out into any of the portable devices 6-1 to 6-3, the compression method conversion program 136 converts the compression method of the content to be checked out into a conversion method which is allowed in the portable device 6-1 or 6-3.

If the encryption program 137 receives, from the recording program 113, a content (not encrypted)-read from for example a CD, the encryption program 137 encrypts the received content in accordance with the same encryption method as that of contents of the content files 161-1 to 161-N stored in the content database 114.

If the compression/decompression program 138 receives, from the recording program 113, a content (not compressed) read from for example a CD, If the compression/decompression program 138 compresses the received content in accordance with the same compression method as that of contents of the content files 161-1 to 161-N stored in the content database 114. The compression/decompression program 138 also decompresses a compressed content, as required.

The usage rule conversion program 139 the usage rule data associated with a content received from the EMD server 4-1 via the network 2 under the control of the purchase application program 115, the usage rule data associated with a content received from the EMD server 4-2 under the control of the purchase program 144, or the usage rule data associated with a content received from the EMD server 4-3 under the control of the purchase program 145, into the same format as that of the usage rule data described in the usage rule files 162-1 to 162-N stored in the content database 114.

The usage rule conversion program 139 also performs a conversion when a content is checked out into any of the portable devices 6-1 to 6-3 such that the usage rule data associated with the checked-out content becomes usable by the portable devices 6-1 to 6-3.

Before copying, moving, checking-in, or checking-out a content, the usage rule management program 140 checks whether the usage rule data has been tampered, on the basis of the hash value (which will be described later) corresponding to the usage rule data described in the usage rule files 162-1 to 162-N stored in the content database 114. If usage rule data described in any of the usage rule files 162-1 to 162-N stored in the content database 114 is updated in response to the operation of copying, moving, checking-in or checking-out a content, the usage rule management program 140 updates the hash value corresponding to the updated usage rule data.

The authentication program 141 performs mutual authentication between the content management program 111 and the purchase application program 115, and also performs mutual authentication between the content management program 111 and the purchase program 144. The authentication program 141 includes an authentication key used in the mutual authentication process between the EMD server 4-1 and the purchase application program 115, between the EMD server 4-2 and the purchase program 144, and between the EMD server 4-3 and the purchase program 145.

The authentication key used by the authentication program in the mutual authentication is not included in the authentication program 141 when the content management program 111 is installed into the personal computer 1. When registration has been successfully performed by the display control program 112, the authentication key is supplied from the EMD registration server 3 and stored in the authentication program 141.

When the personal computer 1 reproduces a content stored in any of the content files 161-1 to 161-N in the content database 114, the decryption program 142 decrypts the content.

When a content is checked out into the portable device 6-2 or when a content is checked in from the portable device 6-2, the PD driver 143 supplies the content to the portable device 6-2 and sends a command to the portable device 6-2 to perform the checking-out or checking-in process.

When a content is checked out into the portable device 6-1 or when a content is checked in from the portable device 6-1, the PD driver 143 supplies the content to the device driver 116-1 and sends a command to the device driver 116-1 to perform the checking-out or checking-in process.

When a content is checked out into the portable device 6-3 or when a content is checked in from the portable device 6-3, the PD driver 143 supplies the content to the device driver 116-2 and sends a command to the device driver 116-2 to perform the checking-out or checking-in process.

The purchase program 144 is a so-called plug-in program which is installed together with the content management program 111. The purchase program 144 may be supplied from the EMD registration server 3 via the network 2 or may be supplied via a CD. When the purchase program 144 is installed into the personal computer 1, the purchase program 144 exchange data with the content management program 111 via an interface in a predetermined form provided in the content management program 111.

The purchase program 144 is described by shuffled or encrypted instructions so that the instructions are concealed from the outside. This makes it difficult for an unauthorized user to analyze the instructions (more specifically, if the unauthorized user directly reads the purchase program 144, it is impossible to analyze the instructions).

The purchase program 144 requests via the network 2 the EMD server 4-2 to transmit a desired content, and receives the content from the EMD server 4-2. The purchase program 144 performs an accounting process when a content is received from the EMD server 4-2.

The purchase program 145 is installed together with the content management program 111. The purchase program 145 requests via the network 2 the EMD server 4-3 to transmit a desired content, and receives the content from the EMD server 4-3. The purchase program 145 performs an accounting process when a content is received from the EMD server 4-3.

The display control program 112 displays a window image on the display 20 in accordance with the filtering data file 181, the display data file 182, the image files 183-1 to 183-K, and the history data file 184. In response to an operation performed by a user upon the keyboard 18 or the mouse 19, the display control program 112 sends a command to the content management program 111 to perform checking-in, checking-out, or other processes.

The filtering data file 181 is stored on the HDD 21 and includes data representing the weighting factors of the respective contents described in the content files 161-1 to 161-N stored in the content database 114.

The display data file 182 is stored on the HDD 21 and includes data corresponding to the contents described in the respective content files 161-1 to 161-N stored in the content database 114.

The image files 183-1 to 183-K are stored on the HDD 21 and include images corresponding to the contents described in the respective content files 161-1 to 161-N stored in the content database 114 or include images corresponding to packages which will be described later.

In the following discussion, in the case where one of the image files 183-1 to 183-K is described without specifying a particular one, it is represented simply as an image file 183.

The history data file 184 is stored on the HDD 21 and includes history data representing, for example, dates and the number of times the contents described in the content files 161-1 to 161-N stored in the content database 114 have been checked out or checked in.

When registration is performed, the display control program 112 transmits identification data, which has been stored in advance, of the content management program 111 to the EMD registration server 3 via the network 2. Furthermore, the display control program 112 receives the authentication key and the EMD selection program 131 from the EMD registration server 3 and transfers the received authentication key and EMD selection program to the content management program 111.

The recording program 113 display a predetermined window image and, in response to an operation performed by a user upon the keyboard 18 or the mouse 19, reads data representing such as the recording time of a content, from an optical disk such as CD 42 mounted on the drive 22.

On the basis of the data representing for example the recording time of a content recorded on a CD, the recording program 113 requests via the network 2 the WWW server 5-1 or 5-2 to send data corresponding to the CD (for example, the album title or the artist name) or data corresponding to the content recorded on the CD (for example, the content title), and receives data corresponding to the CD or data corresponding to the content recorded on the CD from the WWW server 5-1 or 5-2.

If the recording program 113 receives the data corresponding to the CD or the data corresponding to the content recorded on the CD, the recording program 113 supplies the received data to the display control program 112.

If a recording command is input, the recording program 113 reads the content from the optical disk or the CD 42 mounted on the drive 22 and the outputs the content to the content management program 111.

If the content database 114 receives from the content management program 111 a content compressed according to a predetermined compression method and encrypted according to a predetermined encryption method, the content database 114 stores the received content into one of the content files 161-1 to 161-N. The content database 114 also stores usage rule data corresponding to the contents of the content files 161-1 to 161-N in the usage rule files 162-1 to 162-N (on the HDD 21) corresponding to the respective content files 161-1 to 161-N.

The content database 114 may store the content files 161-1 to 161-N or the usage rule files 162-1 to 162-N in the form of records.

For example, the usage rule data associated with the content stored in the content file 161-1 is stored in the usage rule file 162-1. Similarly, the usage rule data associated with the content stored in the content file 161-N is stored in the usage rule file 162-N.

In the following discussion, in the case where one of the content files 161-1 to 161-N is described without specifying a particular one, it is represented simply as a content file 161. Similarly, when one of the content files 162-1 to 162-N is described without specifying a particular one, it is represented simply as a content file 162.

The purchase application program 115 may be supplied from the EMD registration server 3 via the network 2 or may be supplied via a CD-ROM. The purchase application program 115 requests via the network 2 the EMD server 4-1 to transmit a content. If the purchase application program 115 receives the content from the EMD server 4-1, the purchase application program transfers the received content to the content management program 111. The purchase application program 115 performs an accounting process when the content is received from the EMD server 4-1.

Under the control of the content management program 111, the driver 117 drives the audio input/output interface 24 so as to input a content in the form of digital data from the outside and transfer it to the content management program 111, or output a content in the form of digital data supplied from the content database 114 via the content management program 11, or output an analog signal corresponding to a content supplied from the content database 114 via the content management program 11.

A method of preventing a content stored in the flash memory 61 (such as a Memory Stick (trade mark)) of the portable device 6 from being copied in an unauthorized manner is described below.

Figure 5:
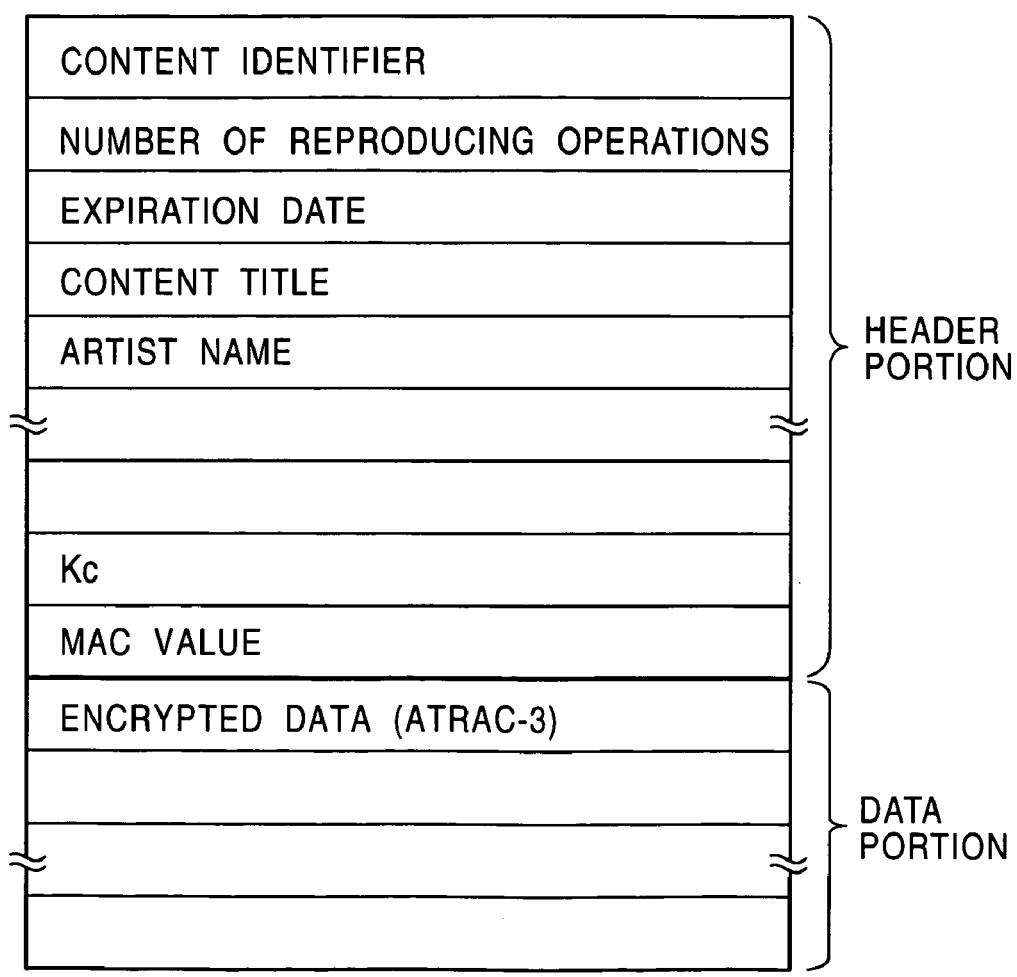
FIG. 5 is a schematic diagram illustrating a content file.

A content file stored in the flash memory 61 of the portable device 6 includes a header portion and a data portion, as shown in FIG. 5. In the header portion, information as to the content identifier, the number of reproducing operations, the reproduction limit, the content title, and the artist name is described. On the other hand, in the data portion, a content compressed according to a compression method such as ATRAC-3 and encrypted is described. In order to prevent the content from being tampered, an MAC (message authentication code) value is described in the header portion of the content file. The MAC value is calculated using a unidirectional function (such as SHA or DES) called a keyed hash in accordance with equation (1) shown below:

$$\text{MAC Value} = \text{MAC}(Kc, \text{Important Information}) \quad (1)$$

where Kc is the content key (encryption key) used to encrypt the content described in the data portion, and Important Information is particular part (as to, for example, the content identifier, the number of reproducing operations performed, and the reproduction limit) of the information described in the header portion.

The content identifier is assigned to the content to identify the content. The content title is data representing the tile of the content in the ASCII (American National Standard Code for Information Interchange) code. The artist name is data representing, in the ASCII code, the artist name, the songwriter name, and/or the composer name associated with the content.

The reproduction limit is data indicating whether the period of time (start date/time, expiration date/time) during which the content is allowed to be reproduced or the limit of the number of reproducing operations (the maximum allowable number of operations of reproducing the content) is set or not. When the limit of the number of reproducing operations is specified, the reproduction limit is set to "1", while it is set to "2", when the period of time is specified. When neither the limit of the number of reproducing operations nor the period of time is specified (as is the case when the content is purchased), the reproduction limit is set to "0".

When the reproduction limit is set to "1" or "2", the value of the number of reproducing operations is updated by the CPU 53 each time the content is reproduced so that it indicates the number of times the content has been reproduced.

Figure 6:
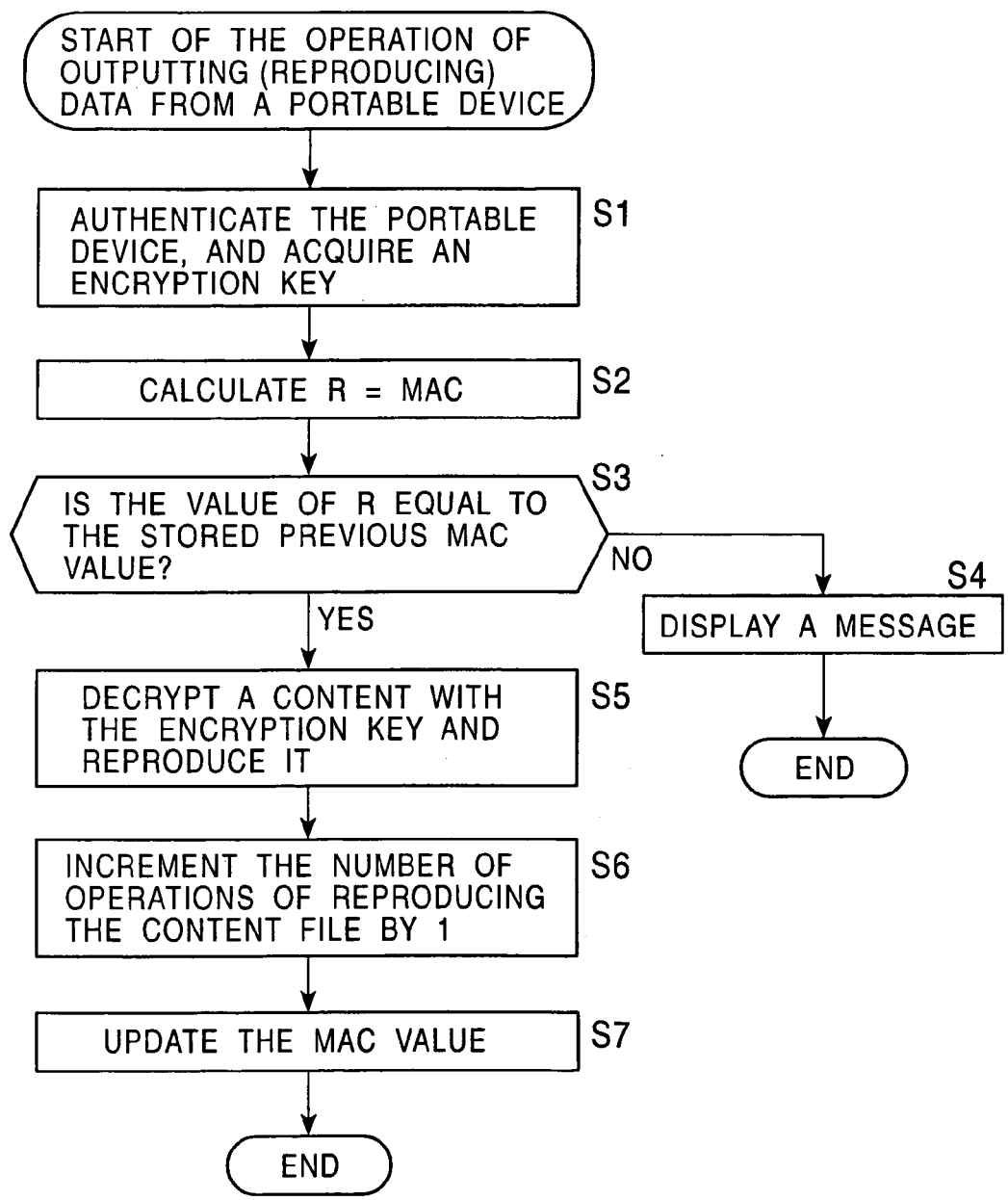
FIG. 6 is a flow chart illustrating the process of outputting a content from a portable device shown in FIG. 1 to the personal computer shown in FIG. 1.

FIG. 6 illustrates the process performed by the personal computer 1 to reproduce a content, such as that shown in FIG. 5, stored in the flash memory 61 of the portable device 6. In step S1, the authentication program 141 of the personal computer 1 performs mutual authentication with the CPU 53 of the portable device 6 and acquires the common communication key Ks. Using the communication key Ks, the authentication program 141 acquires the encryption key Kc used to encrypt the content described in the data portion of the flash memory 61.

More specifically, the authentication program 141 performs mutual authentication with the CPU 53 and acquires a communication key $Ks_1$. On the other hand, the CPU 53 performs mutual authentication with the flash memory 61 via the internal bus 58 and the flash memory controller 60, and acquires a common communication key $Ks_2$.

If the mutual authentication process is unsuccessful, the reproduction process is terminated. If the mutual authentication is successful, the flash memory 61 decrypts the encryption key Kc (encrypted using the storage key) stored therein using the storage key which is also stored therein. The flash memory 61 then encrypts the encryption key Kc with the communication key $Ks_2$ and transmits it to the CPU 53 via the flash memory controller 60 and the internal bus 58. The CPU 53 decrypts the received encryption key Kc using the communication key $Ks_2$.

Furthermore, the flash memory 61 reads the important information and the previous MAC value described in the header portion of a content file (FIG. 5). The flash memory 61 encrypts the important information and the previous MAC value with the communication key $Ks_2$ and transmits them to the CPU 53. Upon reception of the important information and the previous MAC value, the CPU 53 decrypts them using the communication key $Ks_2$.

The CPU 53 encrypts the encryption key Kc, the important information, and the previous MAC value with the communication key $Ks_1$ with the communication key $Ks_1$ and transmits them to the authentication program 141 of the personal computer 1. The authentication program 141 decrypts them using the decryption program 142 in accordance with the communication key $Ks_1$.

As described above, when contents are transmitted between the flash memory 61 and the CPU 53 or between the CPU 53 and the authentication program 141, the contents are encrypted using the communication key $Ks_2$ or $Ks_1$. However, such an encryption process is not described in the following discussion unless it is described for the purpose of emphasis.

In step S2, the user condition management program 140 calculates the MAC value from the encryption key Kc and the important information described in the header portion of the content file obtained in step S1, in accordance with equation (1) described above. The resultant value is substituted into R. In step S3, the usage rule management program 140 compares the value of R calculated in step S2 with the previous MAC value described in the header portion of the content file. If these two values are not equal to each other, the usage rule management program 140 goes to step S4. In step S4, the display control program displays a message such as "There is a possibility that the content may have been tampered." on the display 20, and the process is terminated. In this case, the content stored in the flash memory 61 of the portable device 6 is regarded as being tampered, and thus it is not reproduced.

In the case where it is determined in step S3 that the value of R and the previous MAC value described in the header portion of the content file are equal to each other, the process goes to step S5. In step S5, the content management program 111 receives the encrypted content from the flash memory 61 via the CPU 53. The received encrypted content is then decrypted by the decryption program 142 using the encryption key Kc. The decrypted content is applied to the compression/decompression program 138 to decompress it. The resultant content is output (reproduced) via the audio input/output interface 24.

In step S6, the usage rule management program 140 controls the CPU 53 so as to increment, by 1, the number of reproduction operations described in the important information in the header portion of the content file. Furthermore, in step S7, the use management program 140 controls the CPU 53 so as to calculate the MAC value using the updated important information (in which the number of reproduction operations has been incremented by 1) in accordance with equation (1) and update the MAC value described in the header portion of the content file stored in the flash memory 61 with the calculated value. Because the calculation of the MAC value needs the encryption key Kc, the MAC value can be calculated only when the device or the use management program 140 is authorized.

However, the technique described above with reference to FIG. 6 cannot prevent a content from being copied in an unauthorized manner using a technique described below with reference to FIG. 7. That is, a content file (having an MAC value equal to MAC-1) stored in the flash memory 61-1 of the portable device 6-1 (that is, the flash memory of the first portable device 6-1) is backed up into the content database 114 in the HDD 21 so that the content file is stored as a content file 161-1 (MAC-1) in the content database 114. After the above backing-up process, the original content file (MAC-1) remains in the flash memory 61-1.

Thereafter, the content file (MAC-1) stored in the flash memory 61-1 is moved into the content database 114. As a result, a content file 161-2 (MAC-1) is stored in the content database 114. As a result of the movement of the content file, the content file (MAC-1) is deleted from the flash memory 61-1, and the content database 114 includes two content files 161-1 (MAC-1) and 161-2 (MAC-1).

Thereafter, the content file 161-1 (MAC-1) stored in the content database 114 is restored into the flash memory 61-1. As a result, the content file 161-2 (MAC-1) is left in the content database 114. After that, the content file 161-2 (MAC-1) is moved from the content database 114 into the flash memory 61-2 of the portable device 6-2 (the flash memory 61 of the second portable device 6-2). As a result, the same content file (MAC-1) has been stored into the two flash memories 61-1 and 61-2. Thus, the personal computer 1 can reproduce the content file 161-2 (MAC-1) stored in the flash memory 61-2 as well as the content file 161-1 (MAC-1) stored in the flash memory 61-1.

In the present invention, to prevent contents from being copied in the unauthorized manner described above, the MAC value may be determined in accordance with equation (2) described below.

MAC Value=MAC(Kc, seq# || Important Information) (2)

In equation (2), seq# is a variable which is updated (for example, incremented) each time a content is moved or copied. The variable seq# is stored in the 0th block of a media defect list which is stored in the flash memory 61 and which is not allowed to be accessed by a usual program (which is allowed to be accessed only by the adapter 26 or the usage rule management program 140). In equation (2), symbol || is used to represent concatenation (connection). More specifically, A|| B represents data (a+b bits) produced by simply connecting data A (a bits) and data B (b bits) in such a manner as to place data B immediately following the least significant bit of data A.

The media defect list represents, as shown in FIG. 8A, defective (bad) blocks (blocks including a defect) and alternative blocks which are used instead of the respective defective blocks. If a block is registered as a defective block in this list, the reading and writing of that block is basically disabled, and data is read or written from or to an alternative block corresponding to that block. However, a block having no defect is registered as the 0th defective block so that this block is used by the CPU 53 when a special command is received. The variables seq# are stored in this 0th defective block as shown in FIG. 8B.

The special command can be issued only by the adapter 26 and the usage rule management program 140. Therefore, only the adapter 26 and the usage rule management program 140 can access the 0th defective block.

The variables seq# are assigned to respective contents (tracks) in a one-to-one fashion. Therefore, the recalculation of the MAC value is performed content by content (track by track).

The area where the variables seq# are stored is not limited to the 0th defective block of the media defect list. Alternatively, the variables seq# may be stored in another storage area the reading/writing of which is disabled for the other purposes.

Figure 9:
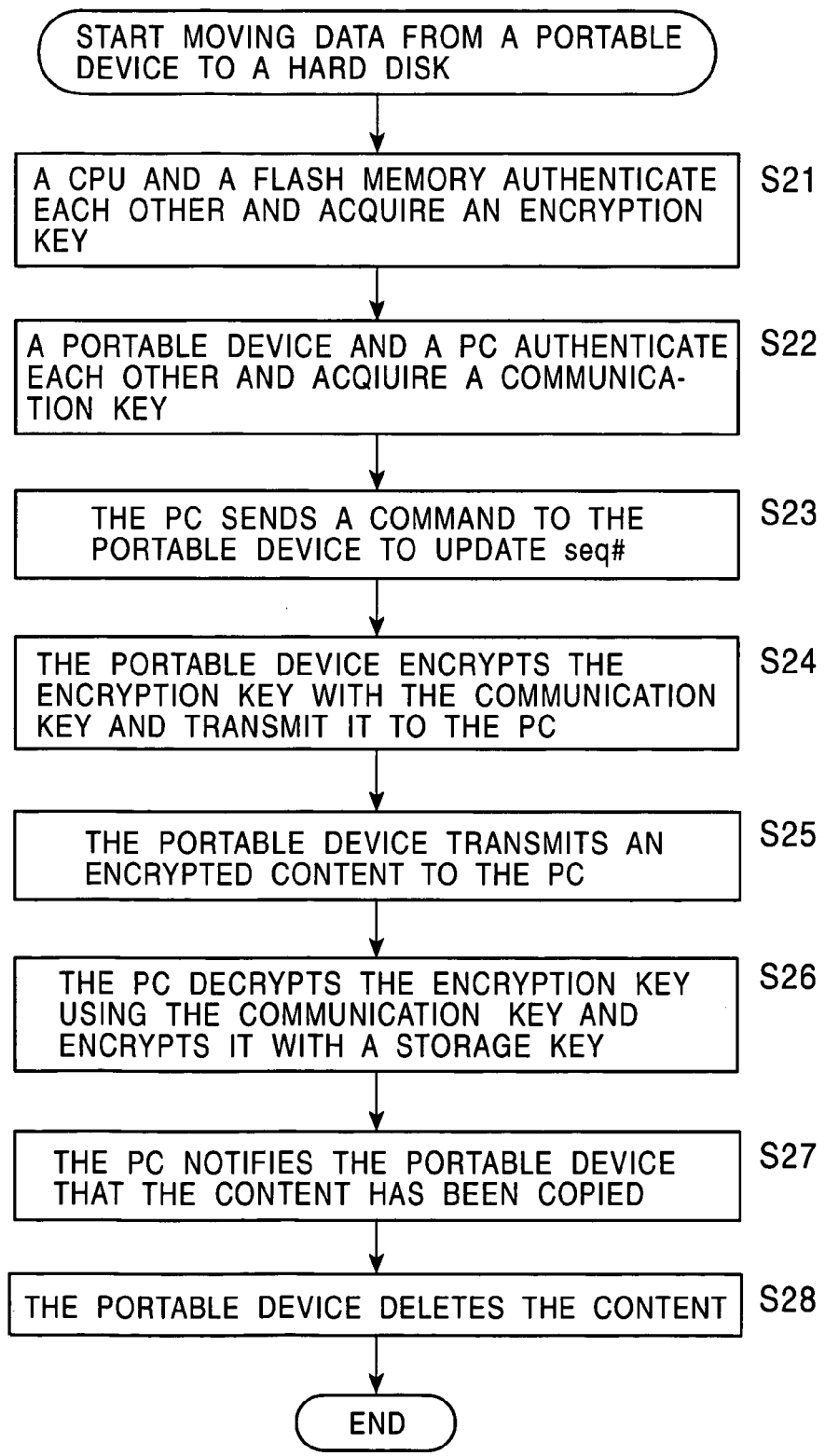
FIG. 9 is a flow chart illustrating the process of moving data from a portable device to the HDD shown in FIG. 2.

FIG. 9 illustrates the process of moving a content from the flash memory 61 into the HDD 21.

In step S21, the CPU 53 performs mutual authentication with the flash memory 61 and acquires the encryption key Kc. In step S22, the authentication program 141 of the personal computer 1 performs mutual authentication with the CPU 53 of the portable device 6 and acquires the communication key Ks which is used by both the authentication program 141 and the CPU 53. This step is performed in a similar manner to step S1 described above with reference to FIG. 6 (except that the common communication key Ks, is used in step S1).

In step S23, the usage rule management program 140 sends the predetermined special command to the CPU 53 so as to request the CPU 53 to update the variable seq# stored in the 0th defective block (FIG. 8B) of the media defect list (FIG. 8A) of the flash memory 61. In response to the request, the CPU 53 updates the variable seq# to a proper value.

In step S24, the CPU 53 encrypts the encryption key Kc acquired from the flash memory 61 in step S22, using the communication key Ks acquired in step S22. The resultant encryption key Kc is transmitted to the usage rule management program 140. In step S25, the CPU 53 receives encrypted content data described in the data portion of a content file stored in the flash memory 61. The CPU 53 encrypts the received data with the communication key Ks and transfers it to the movement management program 134. The movement management program 134 stores the content, transferred from the portable device 6, into the HDD 21 (content database 114). In step S26, the movement management program 134 requests the decryption program 142 to decrypt the encryption key Kc received from the portable device 6, using the communication key Ks. The resultant decrypted encryption key Kc is then decrypted by the encryption program 137 using a dedicated storage key and stored in the HDD 21.

In step S27, the movement management program 134 notifies the CPU 53 that the content file has been copied. In response, in step S28, the CPU 53 deletes the content file (which has been transmitted to the usage rule management program 140 in step S25) from the flash memory 61.

If the movement process is perform in the above-described manner, the unauthorized copying process described above with reference to FIG. 7 can be prevented. Now, let us assume that a content A is stored in the flash memory 61-1 of the portable device 6-1. In this case, the MAC value MAC-1 is described as important information of the content A in the header portion of the content A. Furthermore, the variable seq-1 is stored in the 0th defective block of the media defect list, in correspondence with the content A (hereinafter, such a state is represented by "A(MAC-1), seq-1"). In this state, if the content file is backed up into the content database 114 in the HDD 21, the content A(MAC-1) is stored in the content database 114, and the content A(MAC-1), seq-1 remains in the flash memory 61-1 because the variable seq-1 and the MAC-1 in the flash memory 61-1 are not updated.

Thereafter, if the content A(MAC-1), seq-1 is moved from the flash memory 61-1 into the content database 114, the MAC-1 is not updated although the variable seq-1 of the flash memory 61-1 is updated to the variable seq-2 (in step S23). Thus, the content A(MAC-1) is recorded into the content database 114. The movement management program 134 informs the CPU 53 that the content A has been moved. In response, the CPU 53 deletes the content A from the flash memory 61-1.

If, thereafter, the content A(MAC-1) backed-up in the content database 114 is restored into the flash memory 61-1, a content A(MAC-1), seq-2 is stored into the flash memory 61-1. Furthermore, if the content A(MAC-1) moved into the content database 114 is moved into the flash memory 61-1 of the portable device 6-2, the variable seq-2 is further updated to a variable seq-3, and thus the content is stored as a content A(MAC-1), seq3.

If the content is reproduced from the flash memory 61-1 or 61-2 in accordance with the process shown in the flow chart of FIG. 6, the variable seq-2 (or seq-3) is used in the calculation of the MAC value in step S2, and thus the calculation result becomes different from MAC-1 described in the header portion of the content file. As a result, the determination in step S3 becomes negative. Thus, this content is regarded as an unauthorized copy and the reproduction thereof is disabled.

In the above description, the portable device 6 is employed as a storage medium by way of example. However, the present invention may also be applied, when data is copied or moved to other types of storage media.

In addition to music data and other audio data, the content data may be other types of data such as image data.

The process described above may be performed by hardware or software. In the case where the process is performed by software, the software may be a program which is installed from a program storage medium onto a computer (corresponding to the CPU 53) installed as dedicated hardware in the portable device 6, or onto a general-purpose computer capable of executing various programs installed thereon.

Various types of media may be employed as the program storage medium for storing the program which is to be installed onto a computer and executed by the computer. They include, as shown in FIG. 2, a magnetic disk 41 (such as a floppy disk), an optical disk 42 (such as a CD-ROM (compact disc-read only memory), a DVD (digital versatile disk), a magnetooptical disk 43 (such as an MD (mini-disk), a package medium such as a semiconductor memory 44, and a ROM 12 or HDD 21 for storing a program permanently or temporarily. The program may be stored into the program storage medium via a wire or wireless-communication medium such as the network 2 (local area network or the Internet) or digital broadcasting, using an interface such as the communication device 25 as required.

In the present invention, the steps descried in the program stored in the program storage medium may be performed either in time sequence in accordance with the order described in the program or in a parallel or separate fashion.

Furthermore, in the present invention, the term "system" is used to describe the entire apparatus including a plurality of devices.

As described above, the present invention provides the information processing apparatus, the information method, and the program stored in a program storage medium, in which the result of a calculation performed on the basis of calculation information and an encryption key is compared with a previous calculation result, and use of stored content data is controlled in accordance with the comparison result thereby making it possible to detect content data which has been copied in an unauthorized manner and thus making it possible to prevent content data from being copied in an unauthorized manner.

What is claimed is:

1. An information processing apparatus comprising:
   means for storing content data;
   means for setting a sequential number corresponding to the content data, the sequential number incremented by one when an operation is performed on the content data stored in the means for storing content data;
   means for calculating a hash value corresponding to the content data by performing a predetermined calculation using at least a part of the management data associated with the content data and the sequential number;
   means for comparing a previously calculated hash value included in a header of the content data with the hash value of the content data calculated by the means for calculating upon receiving a request to perform an operation on the content data; and
   means for controlling reproduction of the content data based on the result of the comparison performed by the means for comparing.

2. An information processing apparatus comprising:
   a memory configured to store content data;
   a setting unit configured to set a sequential number corresponding to the content data, the sequential number incremented by one when an operation is performed on the content data stored in the memory;
   a calculation unit configured to calculate a hash value corresponding to the content data by performing a predetermined calculation using at least a part of the management data associated with the content data and the sequential number;
   a comparison unit configured to compare a stored hash value included in a header of the content data with the hash value of the content data calculated by the calculation unit upon receiving a request to perform an operation on the content data; and
   a control unit configured to control reproduction of the content data based on the result of the comparison performed by the comparison unit.

3. An information processing apparatus comprising:
   means for storing content, said content comprising management information and calculation information;
   means for storing a sequential number incremented upon each operation on the content stored in content storage, the sequential number associated with the content stored in the content storage;
   means for calculating the calculation information based on the management information and a latest sequential number stored in the memory;
   means for incrementing the sequential number upon receiving a request to perform an operation on the content and storing the incremented sequential number in the means for storing a sequential number;
   means for updating the management information upon receiving a request to perform an operation on the content, and storing the updated management information in the means for storing content;
   means for reading the calculation information included in the content from the means for storing content, the management information included in the content, and the latest sequential number from the means for storing a sequential number;
   means for comparing calculation information included in the content read by the reading means with calculation information calculated by the calculation means upon receiving a request to perform an operation on the content; and
   means for controlling an operation on the content based on a result of the comparison done by the means for comparing.

4. The information processing apparatus of claim 3, wherein:
   means for calculating performs said calculation by applying a hash function to the calculation information included in the content.

5. The information processing apparatus of claim 3, wherein:
   the content is music data; and
   the management information includes identification information identifying the music data.

6. An information processing method, comprising the steps of:
   storing content in a first memory, said content comprising management information and calculation information;
   storing a sequential number incremented upon each operation on the content stored in a second memory, the sequential number associated with the content stored in the first memory;
   calculating the calculation information based on the management information and a latest sequential number stored in the second memory;
   incrementing the sequential number upon receiving a request to perform an operation on the content and storing the incremented sequential number in the second memory;
   updating the management information upon receiving a request to perform an operation on the content, and storing the updated management information in the first memory;

reading the calculation information included in the content from the first memory, the management information included in the content, and the latest sequential number from the second memory;

comparing calculation information included in the content read in the reading step with calculation information calculated in the calculating step upon receiving a request to perform an operation on the content; and controlling an operation on the content based on a result of the comparing step.

7. An information processing apparatus comprising:

a content memory configured to store content comprising management information and calculation information;

a memory configured to store a sequential number incremented upon each operation on the content stored in the content memory, the sequential number associated with the content stored in the content memory;

a processor configured to calculate the calculation information based on the management information and a latest sequential number stored in the memory;

the processor configured to increment the sequential number upon receiving a request to perform an operation on the content and storing the incremented sequential number in the memory;

the processor configured to update the management information upon receiving a request to perform an operation on the content, and storing the updated management information in the content memory;

the processor configured to read the calculation information included in the content from the content memory, the management information included in the content, and the latest sequential number from the memory;

the processor configured to compare calculation information included in the content read by the processor with calculation information calculated by the processor upon receiving a request to perform an operation on the content; and a controller configured to control an operation on the content based on a result of the comparison performed by the processor.

8. The information processing apparatus of claim 7, wherein:

the processor performs said calculation by applying a hash function to the calculation information included in the content.

9. The information processing apparatus of claim 7, wherein:

the content is music data; and the management information includes identification information identifying the music data.

* * * * *